United States Patent [19]

Blemberg et al.

[11] Patent Number: 5,143,677
[45] Date of Patent: Sep. 1, 1992

[54] CO-EXTRUSIONS METHODS

[75] Inventors: Robert J. Blemberg, Appleton; John P. Eckstein, Neenah; Mark E. Nordness, Appleton, all of Wis.

[73] Assignee: American National Can Company, Chicago, Ill.

[21] Appl. No.: 458,488

[22] Filed: Dec. 28, 1989

Related U.S. Application Data

[63] Continuation-in-part of Ser. No. 204,485, Jun. 9, 1988, abandoned, and a continuation-in-part of Ser. No. 140,096, Dec. 31, 1987, Pat. No. 4,944,972.

[51] Int. Cl.[5] .................. B29C 47/06; B29C 47/20
[52] U.S. Cl. ................... 264/173; 264/514; 264/209.8; 425/133.1; 425/462
[58] Field of Search ............ 264/171, 514, 173, 209.8; 425/133.1, 131.1, 462, 133.5

[56] References Cited

U.S. PATENT DOCUMENTS

| 3,511,903 | 5/1970 | Glass . | |
|---|---|---|---|
| 3,528,130 | 9/1970 | Lefevre et al. | 425/133.5 |
| 3,558,755 | 1/1971 | Laban et al. | 264/514 |
| 3,606,636 | 9/1971 | Glass et al. | 425/131.1 |
| 3,707,590 | 12/1972 | Wiggins et al. | 264/514 |
| 4,042,661 | 8/1977 | Cook | 425/382.4 |
| 4,265,693 | 5/1981 | Nishimoto et al. | 425/133.1 |
| 4,804,510 | 2/1989 | Luecke et al. | 425/133.1 |
| 4,842,791 | 6/1989 | Gould et al. | 425/131.1 |

FOREIGN PATENT DOCUMENTS

| 323043 | 7/1989 | European Pat. Off. . | |
|---|---|---|---|
| 345987 | 12/1989 | European Pat. Off. . | |
| 51-108863 | 1/1976 | Japan | 425/133.5 |
| 57-80024 | 5/1982 | Japan | 264/171 |
| 61-32733 | 2/1986 | Japan . | |
| 7408440 | 12/1974 | Netherlands | 264/514 |
| 203283 | 5/1980 | United Kingdom . | |

Primary Examiner—Jeffrey Thurlow
Attorney, Agent, or Firm—Robert A. Stenzel

[57] ABSTRACT

Apparatus and method for fabricating films and packages, especially films and packages containing a layer of vinylidene chloride copolymer. The preferred apparatus includes a coextrusion feedblock (20) in combination with an annular extrusion die (10) having an internal crosshead mandrel (11), and intervening spacing means for conveying the melt stream (24) from the feedblock to the die. The mandrel (11) has a cross-head groove (14), whose preferred design resembles elements of a rectangle. The inner surface of the outer die wall (19) preferably has an offset portion, including one of a pair of ramps (33A, 33B) traversed by the melt stream (24) as it leaves the groove. The die (10) maintains the melt stream in a single basic shape as the melt stream traverses the die. The VDC copolymer is shielded from the equipment surfaces beyond the VDC copolymer extruder. Equipment surfaces beyond the VDC copolymer extruder are protected from the VDC copolymer. The effective shielding enables use of a die (10) greater than 85 cm. circumference at its exit (31).

13 Claims, 5 Drawing Sheets

CO-EXTRUSIONS METHODS

This application is a continuation in part of application Ser. No. 07/204,485, filed Jun. 9, 1988 now abandoned and application Ser. No. 07/140,096, filed Dec. 31, 1987 now U.S. Pat. No. 4,944,972, both of which are incorporated herein by reference in their entireties.

BACKGROUND OF THE INVENTION

This invention resides in improvements in methods for coextruding of multiple layer polymeric films. It also resides in the apparatus used in the novel methods, in the novel films made therewith, and in packages made from those films. As used herein "structure" means and includes multiple layer film, multiple layer sheet, and packages made with the multiple layer films and the multiple layer sheets of the invention.

Vinylidene chloride copolymers (VDC) provide barrier to transmission of moisture vapor and oxygen and therefore are desirable for use when those properties are important. The extrusion of VDC to form tubular films has previously been practiced with annular dies having crosshead type mandrels. Spiral type mandrels are not generally used with VDC because the dwell time is desirably minimized when extruding VDC, and the amount of low shear areas in the die is desirably minimized, to prevent, or delay, the degradation of the VDC. Spiral mandrels do not generally possess these characteristics.

It is commonly known that the extrusion of VDC and other thermally degradable polymers such as EVOH and Nylon is accompanied by a plurality of processing problems. These processing problems generally relate to the sensitivity of the thermally degradable polymers to the combination of elevated temperature of the polymers contact between the polymer and hot metal, and the amount of time for which the high temperature contact is maintained between the polymer and the metal surfaces of the extrusion processing equipment during the extrusion process. For purposes of convenience the abbreviation VDC will be used for vinylidene chloride copolymers below. However, one skilled in the art will understand that the benefits of the present invention can be achieved with other thermally degradable polymers including EVOH and Nylon.

One problem with crosshead mandrel-type dies is that the VDC tends to leak into the fitment area above the crosshead groove of the annular die. There it degrades, and washes back out as carbon, typically carbon particles, into the groove and subsequently into the film-forming channel, especially along the weld line of the film. The direction of flow of the leaking polymer is a generally into the fitment area between the mandrel and the die outer wall, and then back into the channel near the weld line. The problem of leakage into the fitment area can be addressed by proving close tolerances above the groove, between the inside surface of the outer containing wall of die and the outside surface of the mandrel. Alternatively, the mandrel and the outer containing wall can be cooperatively tapered to provide a tighter fit. A shrink fitting arrangement can also be used. Both the taper fit and shrink fit techniques are, however, susceptible to accelerated wear and early failure. Further, shrink fitting arrangements take longer to disassemble and reassemble, such as for cleaning.

Another problem, which is generic to VDC extrusion, is that carbon generally can and does form in all areas where the VDC contacts metal in the die. As a processing run proceeds, carbon deposits develop in the die and, in an annular die, eventually become thick enough to affect the distribution of the polymer around the circumference of the die; as well as affecting the flow rate and the associated back pressure at the extruder. The build-up of carbon is usually experienced in a mandrel-type die as a progressive function related to the time during which the die is continuously in use. The die generally must be shut down, disassembled, and cleaned after a running period of only a few days, typically 7-10 days. In some cases the die can be purged, whereby the shutdown can be postponed for a few days. However, even purging can only postpone shutdown for a short time, measured in days, not a plurality of weeks.

The problems discussed above have generally been associated with the contact between the VDC copolymer and the die metal when both the die and the VDC copolymer are at elevated extrusion processing temperature. The above problems have been somewhat attenuated in conventional practice, for cast extruded film and sheet formed from that film, by completely encapsulating the VDC copolymer with another material (typically ethylene vinyl acetate or ethylene methyl acrylate) at the die. In conventional practice, after the VDC copolymer has been encapsulated in the encapsulating polymer (for example EVA), the encapsulated combination is then fed through a conventional cast extrusion die, such as through a coat hanger die, which forms the extruded stream, through a long slender slot, into a flat sheet of film, which is typically cast onto a metal roll for cooling.

An hypothetical problem in this type of film fabrication is that the edges of the film, being totally encapsulated, do not contain any VDC, as taught in U.S. Pat. No. 4,804,510. If these edge portions of the film are anticipated for being used, the lack of VDC in the edge portions can be a serious problem. However, since edge portions of cast extruded film are typically removed by conventional edge trimming, these areas of the film are typically not used and thus the hypothetical problem is usually eliminated by a conventional step in the cast extrusion processing.

With total encapsulation of the VDC before entering an annular die, the encapsulated layer could not form a part of the weld line as defined herein, since, by definition, its edges must touch in order to form a part of the weld line. But the encapsulated edges could not touch because of the interference of the encapsulating polymer. This would result in an area of the film, extending the full length of the film, along the crosshead weld line of the film, which would be devoid of the VDC copolymer. Since VDC is generally used because of its excellent barrier properties, either barrier to oxygen permeation, or barrier to water vapor permeation, such a gap in the protection, particularly for a tubularly shaped package, is unacceptable. While such a process could be used with trimming away of the area which is devoid of the VDC copolymer and rejoining of the trimmed edges by means of, for example, a lap seam or joint, such a process would be expensive, would necessarily open the tube, and would be economically disadvantageous as compared to other extrusion processes desired for forming a tube. Further such a process would sacrifice a significant advantage of circumferential unity normally obtained from tubular extrusion processes. Total encapsulation would also preclude conventional die oscillation for the purpose of distributing thickness variations. Yet the encapsulation concept provides a potentially significant advantage in that the frequency of the shut downs for cleaning of the die is reduced.

The sensitivity of VDC to the extrusion process, especially the tubular extrusion process, has resulted in the development of only limited-size commercial dies for fabrication of tubular films, with typical die sizes being less than 25 cm. (10 inches) circumference at the die opening. The larger the circumference of the die, the greater the amount of time that the polymer spends at the elevated temperature in the die. In traversing the die, the polymer travels around the circumference of the crosshead mandrel and/or the die channel leading to the die exit orifice, all in the process of being fabricated into a film. Thus processes for fabrication of films greater than 25 cm. (10 inches) in circumference in a transverse direction, perpendicular to the machine direction, at the die exit, and containing VDC, are generally carried out with a slot die of the cast extrusion type, followed by fabrication of the tube in a converting process. While known art indicates that circumferences at the die orifice, up to 79.8 cm. have been developed, as in 4,379,117, Baird Jr. et al, such dies at present have limited applicability and are not in wide-spread use.

To the extent tubular film processing conditions are important to achieving the desired film properties, and especially at low blow-up ratios, the tube size has heretofore been undesirably limited by the sensitivity of the VDC copolymer, or some other material has had to be substituted for the VDC copolymer. Namely, large size tubes of tubularly extruded films containing VDC could not be fabricated on a commercial scale, if at all. Indeed, commercial scale tubular fabrication has been limited to small diameter tubes such as those fabricated with dies about 10 cm. (4 inches) in diameter or less.

Thus it is desirable to provide methods for fabricating tubular multiple layer films containing a layer of VDC, which methods overcome the above problems.

It is further desirable to overcome especially the problem of the VDC copolymer getting into the fit area above the crosshead groove.

It is still further desirable to reduce the formation of carbon in the die, from degradation of VDC.

Still another desire is to reduce the fraction of the internal surface area of the die which is exposed to the VDC copolymer.

Provisions for the above improvements are taught in the above-identified applications, Ser. Nos. 07/140, 096 (now U.S. Pat. No. 4,944,972) and 07/204,485 abandoned.

It is an object of this invention to provide a method which accommodates early joinder of melt streams while providing assured layer configuration and improved uniformity of layer thicknesses, about the die circumference, at the die exit.

It is another object of the invention to provide apparatus compatible with the novel methods.

It is still another object to provide novel structures made by the methods and apparatus of the invention.

SUMMARY OF THE DISCLOSURE

This invention includes apparatus for fabricating a plurality of steams of molten polymer into a multiple layer film in the shape of a tube. The apparatus includes a coextrusion feedblock. The feedblock has means for receiving a plurality of in-feed streams of molten polymer, and means for combining the plurality of in-feed streams into a multiple layer exit melt stream. The exit melt stream comprises at least two, preferably at least three layers, each of the at least two or three layers extending to an outer surface of the exit melt stream. The apparatus further comprises an annular extrusion die having an inlet for receiving a polymeric melt stream, and a crosshead mandrel. The apparatus preferably comprises spacing means for conveying the multiple layer exit melt stream from the feedblock to the crosshead mandrel.

The die includes a fluid communication passage means extending between the die inlet and the annular die outlet. The die forms the multiple layer exit melt stream, which comes from the feedblock, into the referred-to multiple layer film in the shape of a tube as it progresses between the die inlet and the die outlet.

The crosshead die mandrel preferably has an annular crosshead groove in fluid communication with the die inlet. The groove preferably defines cross-sections comprising at least two, preferably three, sides of a rectangle. The die also preferably includes an adapting zone for changing the direction of flow of the melt stream in the die before the melt stream reaches the crosshead groove in the mandrel.

The die preferably has a pair of transition ramps on opposing sides of the passage means, the ramps being disposed on opposing sides of the passage means, at the lower end of the crosshead groove at the entrance to a film forming channel, which is disposed between the crosshead groove and the die outlet.

Using the invention, the circumference of the mandrel, and therefore, of the die, is not limited because of the use of a VDC copolymer. Rather the die can have any desired circumference, and satisfactorily process VDC. Accordingly, the mandrel (e.g. the orifice of the annular die) can be greater than 85 cm. (33 inches), whereby a film made with a die that size or greater, can be fabricated. The die size limits are governed by die making and die using expertise which is separate from consideration of VDC degradation.

In preferred embodiments, the die inlet and all die passage means between the inlet and the outlet are adapted to maintaining the cross-section of the melt stream in the same basic shape with which it can be identified when it enters the die, illustrated as polygonal. The melt stream, as it passes through the die, comprises a series of precursors of the basic shape with which it is defined when it enters the die. Conversely the melt stream cross-section as extruded from the die exit can be identified in the melt stream cross-section entering the die from the feedblock, whereby the several shapes of the melt stream as it traverses and exits the die, are derivatives of the melt stream as it exits the feedblock.

Another preferred identifying feature of apparatus of this invention is in the outer annular containing wall of the die. An inner portion of the inner surface of the outer containing wall, between the outlet end of the die and the crosshead groove, is offset laterally, preferably inwardly, from the corresponding outer portion of the inner wall which is disposed between the inlet end of the die and the groove. The outer one of the pair of transition ramps preferably bridges the inner and outer portions of the inner surface of the outer containing wall.

Either one, preferably both, of the transition ramps define essentially a single angle (each), preferably between about 20° and about 70°, with respect to the corresponding directly adjacent portion of the film forming channel.

The invention importantly includes methods of fabricating a tubular multiple layer polymeric film from a plurality of in-feed streams of molten polymer. The method generally comprises feeding the in-feed streams through a coextrusion feedblock which is normally used in a cast extrusion process for fabricating a flat film with a straight slot die. The feedblock receives the in-feed streams and combines them into a multiple layer melt stream. The melt streams from the feedblock comprises at least two layers, preferably at least three layers. In three-layer structures, the three layers include a first interior layer disposed between second and third shielding layers. The interior layer extends to opposing outer surfaces of the melt stream. The multiple layer melt stream is conveyed from the feedblock to a crosshead type annular mandrel which is in an annular extrusion die. The melt stream is forced through the die, whereby the die forms the melt stream into the multiple layer tubular film.

Preferably the process includes conveying the melt stream received from the feedblock through a direction-changing adapting zone in the die, and conveying the melt stream from the adapting zone to the crosshead groove. In the process of traversing the adapting zone, the flow of the melt stream is changed from a first direction to a second direction in the die, without changing the basic shape of the cross-section of the melt stream.

The advantages of the invention are discernable when the method includes selecting a composition for the first interior layer wherein the extrudable polymer content is at least 25%, preferably at least about 75%, more preferably at least about 85%, and up to 100% by weight VDC. The invention is even more readily discernible, and its value more readily recognized, where the composition, including VDC in the first layer is forced through a die having a circumference at the annular die opening greater than 85 cm. (33 inches), preferably greater than 90 cm. (35 inches), more preferably greater than 100 cm. (39 inches), or 125 cm. (49 inches), and up to 250 cm. (98 inches), or more, including all sizes greater than 85 cm. The corresponding circumferences of such recited films, using a nominal blow-up ratio of 2.5/1, are 213 cm. (84 inches), 225 cm. (89 inches), 250 cm. (98 inches), 313 cm. (123 inches), and 625 cm. (246 inches). For smaller diameter die openings the present invention provides a significant benefit in that there can be longer runs between shutdowns to purge the die.

The method of the invention preferably includes fabricating a tubular film having a VDC copolymer layer, and second and third layers on opposing sides of the VDC copolymer layer, by forcing a melt stream comprising the VDC copolymer layer, and the second and third layers, through a de having a crosshead groove, whereby a tubular film is obtained having opposing edges of the melt stream, including opposing edges of the VDC copolymer layer, touching each other at a weld line; and wherein opposing respective edges of the second layer are also touching each other at the weld line. Opposing edges of the third layer are further touching each other at the weld line. At least about 90% of the surface area of the VDC copolymer melt stream, which is in the extrusion apparatus at any given instant, is shielded from direct contact with surfaces of the die. Preferably, at least 95% of the surface area of the VDC copolymer is shielded.

The shielding is by one or more shielding layers, and is, in some embodiments, defined from a point beginning at a combining means. The shielding melt stream, or streams, are interposed between the VDC copolymer and the internal surfaces of the combining means. The shielding extends through all apparatus traversed by the composite melt stream until it exits the die.

Melt stream surface area is defined in all three dimensions, at all interfaces of the melt stream, with two dimensions applying at any given surface locus.

The method can also be comprehended as a means of shielding the internal surface area of the extrusion apparatus from direct contact with a VDC copolymer melt stream. In that regard, at least about 90%, typically at least 95%, of the internal surface area of the die is so shielded in preferred methods of the invention.

Another aspect of the invention is the multiple layer tubular film formed by the apparatus and the methods disclosed herein. The film has a first layer having a pair of opposing surfaces, and a second, and optionally a third layer on respective ones of the opposing surfaces. The tubular film comprises opposing edges of a first one of the layers touching at a weld line. The weld line defines the locus of meeting of the respective opposing edges of corresponding layers of the melt stream at a position generally 180° around the die mandrel from the locus of entrance of the melt stream into the crosshead groove. The weld line extends sequentially through the second, first, and third layers in a continuous path at an average angle, between the pair of opposing surfaces, greater than 45 degrees, usually approaching about 90 degrees. That single weld line extends in an uninterrupted path through all the layers in a generally singular direction, with opposing edges of each of the first and second layers touching at the weld line.

In those embodiments which experience greatest benefits from the technical value of this invention, the first layer comprises VDC, and both the second and third layers are essentially free from VDC. The second and third layers do comprise polymeric compositions compatible with coextrusion with VDC.

The methods disclosed herein are adapted to fabricating film and/or sheet. The films of the invention can readily be made into packages, preferably flexible packages, also packages which have components which are more rigid and components which are more flexible.

DETAILED DESCRIPTION OF THE ILLUSTRATED EMBODIMENTS

Figure 1:
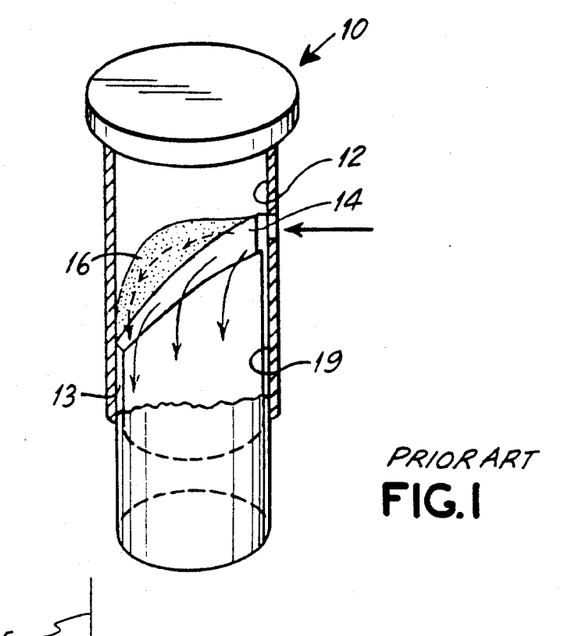
FIG. 1 shows a typical conventional crosshead mandrel of the prior art and indicates the typical leakage of polymer into the fitment area above the crosshead groove.

In FIG. 1, the die 10 has a fitment area 12 above crosshead groove 14. Typical polymer leakage into fitment area 12 is shown at stippled area 16. The dashed arrows through stippled area 16 indicate generally the typical direction of leakage of the polymer in the fitment area. The solid arrows show the primary direction of the flow of polymer about groove 14.

In preferred embodiments of this invention, and inner layer embodiments of this invention, an inner layer "B" of a VDC-containing composition is sandwiched between two outer layers "A" of non-VDC materials, in a coextrusion feedblock which is typical of that used for forming non-tubular structures, which do not contain VDC. The melt stream sandwich is fed into a tubular die having a crosshead type mandrel with a crosshead groove, where the melt stream sandwich is fabricated into a tubular film.

Figure 2:
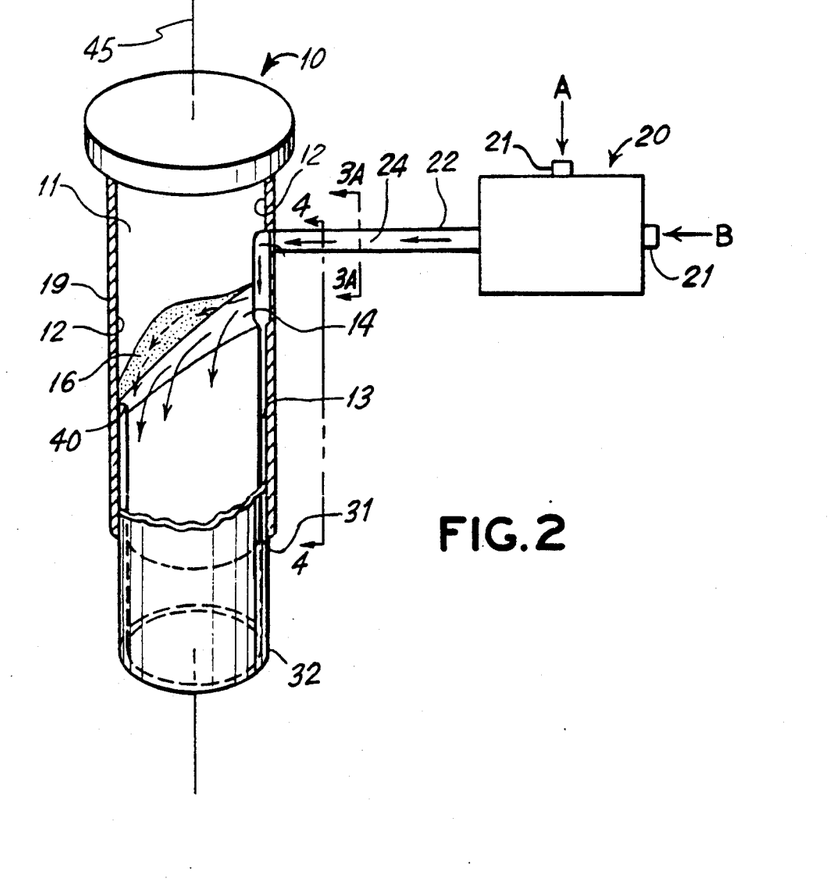
FIG. 2 shows a general layout of a portion of the apparatus typically used in the invention, including a coextrusion feedblock, parts of a die assembly having a crosshead type mandrel with an adapting zone, and means for conveying the polymer from the feedblock to the die.

Referring now to FIG. 2, and representing one embodiment of apparatus of the invention, block 20 represents a typical non-VDC coextrusion feedblock, well known in the cast extrusion art for fabricating flat films, but not applied in the tubular extrusion art. A conduit 22, such as a rectangular pipe, extends between feedblock 20 and annular crosshead die 10, which includes crosshead mandrel 11. The die components shown include mandrel 11 and containing wall 19. Other die components, not shown, are conventional, or are readily adapted to accommodate the modifications to the die 10 which are disclosed herein for mandrel 11 and containing wall 19.

Feedblock 20 is preferably mounted to the VDC copolymer extruder at the extruder outlet Accordingly, the shielding layers A of, for example, EVA polymer are imposed between the VDC copolymer melt stream and the internal surfaces of the equipment at an early stage in the processing of the VDC copolymer melt stream. As seen above and referring to FIGS. 3, 3A, 6, 8, 10, and 11, the EVA maintains its position between the VDC copolymer and the internal equipment surfaces as the combined /A/B/A/ melt stream travels through the die 10.

Feed streams A and B (FIG. 3) represent in-feed streams of the molten polymers A and B entering the feedblock 20. Streams A and B are received by the feedblock 20 at orifices 21. The feedblock 20 can be adapted to receive more than 2 streams, and combine them into the respective layers. Accordingly, it is acceptable that layers A on either side of layer B can have different compositions.

Polymers A and B are combined into a multiple layer melt stream, namely melt stream 24, in feedblock 20, which melt stream exits feedblock 20, and is conveyed by conduit 22 to die 10, where the melt stream is conveyed to crosshead mandrel 11. FIG. 3A shows the melt stream 24 in cross section in conduit 22, depicted essentially as it appears when it leaves feedblock 20, and disclosing its overall configuration. As seen in FIG. 3A, layer B is disposed between the two outer layers A. It is also seen in FIG. 3A that the interior layer B extends to opposing outer surfaces 25 of the melt stream 24. The outer layers A, also, extend to the opposing outer surfaces 25 of the melt stream, as well as providing the upper and lower surfaces 27 which are in contact with the upper and lower wall surfaces of conduit 22.

In a conventional arrangement of VDC tubular extrusion apparatus, the VDC copolymer extruder is positioned to feed directly into the die, to minimize the time during which the VDC copolymer is exposed to the combination of (i) high extrusion processing temperature (of the VDC copolymer) and (ii) contact with the hot metal surfaces on the interior of the extrusion apparatus. The positioning of the layers A on both sides of the VDC copolymer in feedblock 20 reduces the surface area of contact between the VDC copolymer and the internal metal surfaces. As a result of the A-layer shielding, the time during which the VDC copolymer is exposed to the elevated processing temperature is less important. With the time being less important, conduit 22 can be introduced into the processing apparatus system, as seen in FIG. 2, with little, if any, negative affect on the quality of the film produced by die 10. So, effectively, this invention makes the VDC copolymer less sensitive to the extrusion processing operation.

A primary purpose of the outer layers A is to reduce the area of contact between VDC copolymer, as in inner layer B, and the interior surfaces of the extrusion processing equipment, especially the die. Thus, layers A need be only thick enough to prevent contact in the die, except at outer surfaces 25, between the VDC copolymer and the respective adjacent die surfaces. Such contact will also be prevented in conduit 22, except at outer surfaces 25, as shown in FIG. 3A. Thus the individual layers A in the extruded film 32 can be as thin as about 0.005 mm. (0.2 mil), about 5% or 10% of the film thickness, whichever is less. The thicknesses of the layers A can be the same, or different, depending on their specified characteristics. Layers A can advantageously be used as adhesive layers between layers B and adjoining inner and/or outer layers which can be combined with the melt stream 24 in die 10, and as illustrated hereinafter with respect to FIG. 9 and 14. Overall, the combined thicknesses of the two layers A in the A/B/A structure of film 32 is usually between 2% and 80%, preferably between 5% and 50%, most preferably between 5% and 30%, of the thickness of the A/B/A structure. The percentage may be lower than 2% when thick structures are being fabricated, for example greater than 0.250 mm. (10 mils) thick overall.

FIG. 2 represents a simplified illustration of a die of the invention. Mandrel 11 includes an adapting zone 26 between the location where melt stream 24 enters die 10, and where it enters the crosshead groove 14. Adapting zone 26 causes the melt stream 24 to change directions between its entrances into die 10 and its entrance into crosshead groove 14. As seen in FIG. 2, the flow of the melt stream received from feedblock 20 changes from a first direction, as it approaches mandrel 11, to a second direction in the adapting zone 26, generally perpendicular to the first direction. The perpendicular is illustrative only, and is not a limitation. The flow direction is further adapted and changes directions again, especially by means of groove 14 and channel 13, whereby the melt stream is fabricated into a tubular film, and is conveyed by the channel 13 to the external annular opening 31 in the die in a third definable direction generally depicted by the solid arrows projecting downwardly from groove 14.

In changing from the first direction to the second direction, the melt stream passes through adapting zone 26. In changing from the second direction to the third direction, the melt stream passes through crosshead groove 14.

The second and third directions of flow of the polymer in the exemplary A/B/A structure are, in many cases, closer to alignment with each other than are the first and third directions of flow. It is entirely acceptable that the second and third directions be the same, allowing for an intermediate direction change as the polymer flows around mandrel 11 and in groove 14. Most of the polymer does flow circumferentially around the die, as in groove 14, between its flowings in the second and third directions.

Figure 3:
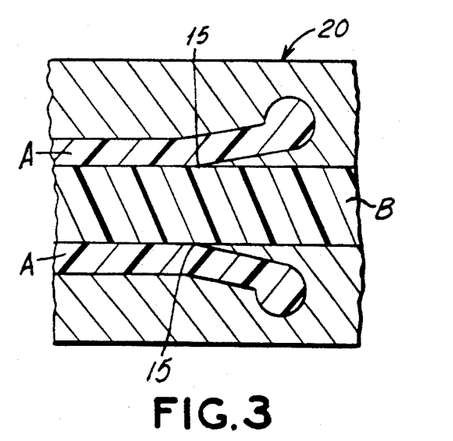
FIG. 3 shows an enlarged cross-section of a fragment of the feedblock shown in FIG. 2.
Figure 3A:
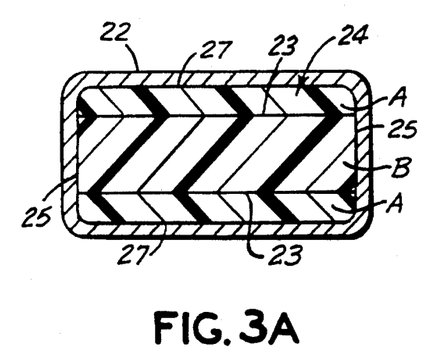
FIG. 3A shows a cross section of the melt stream in the conveying means and is taken at 3A—3A of FIG. 2.
Figure 4:
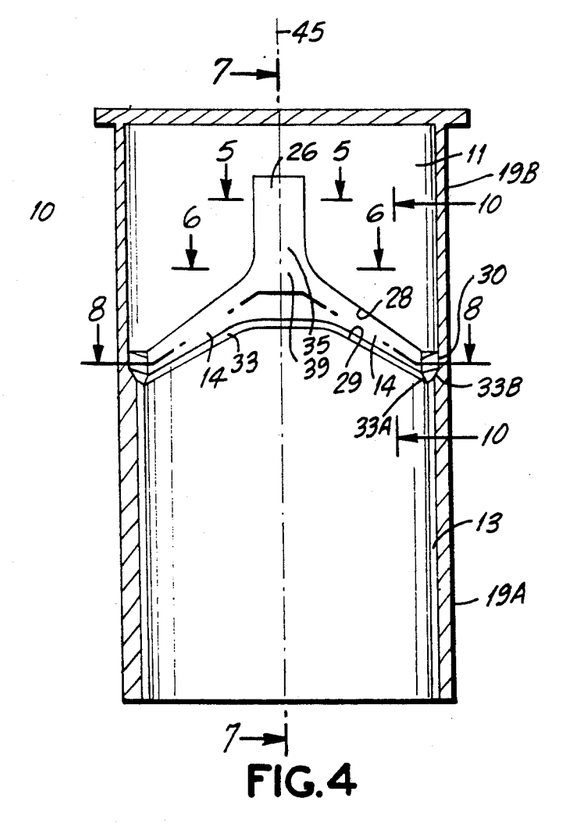
FIG. 4 shows a side view, with parts cut away, of the die of FIG. 2, and is taken at 4—4 of FIG. 2, includes improved and preferred die configurations, and illustrates the tubular film being extruded from the die exit.
Figure 5:
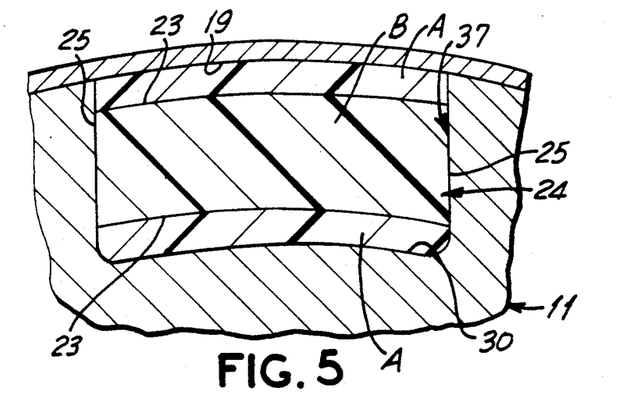
FIG. 5 shows a cross section of the melt stream taken at 5—5 of FIG. 4, in the area of the adapting zone.

The first change in direction, from the first direction to the second direction, is illustrated in the cross sections of the 3-layer polymer stream as depicted in FIG. 3A and 5, and with relation to the location of the cross sections 3A—3A in FIG. 2 and 5—5 in FIG. 4. It is seen from comparing FIGS. 3A and 5 that the cross sections are similar, with two differences. One difference is in the direction of flow of the melt stream at the locus where the cross section is shown. The melt stream in FIG. 3A is flowing toward a central axis 45 of the die, seen in FIG. 4. The melt stream in FIG. 5 is flowing generally parallel to the central axis 45 of the die. The other difference is in the curvature of the cross-section of FIG. 5 in adaptation to the annular configuration of the outer surface of mandrel 11 and the inner surface of containing wall 19. The cross-section at 5—5 of FIG. 4 could represent initial lengthening and thinning of the passage 37 for beginning the formation of the rectangular melt stream 24 into the thinner polymer stream required for forcing the polymer through the film-forming channel 13. The lengthening is clearly seen in passage 37 in the area 6—6 of throat 35, and downstream thereof in FIG. 4. The thinning is seen in throat 35 in FIG. 7. The combined lengthening and thinning is seen in cross-section by comparing FIGS. 5 and 6, and their visually depicted lengths and thicknesses, which represent relative structural differences along the traversal of passage 37.

The illustrated embodiment is somewhat simplified in that the deformation of melt stream 24 is essentially separated from (a) the function of conveying melt stream 24 to the die through conduit 22, and (b) the changing of the direction of flow of the melt stream in adapting zone 26. It is contemplated that those functions could be integrated, and conduit 22 even eliminated, so that the melt stream 24 travels in substantially the same direction as the flow of the stream through the die.

Figure 6:
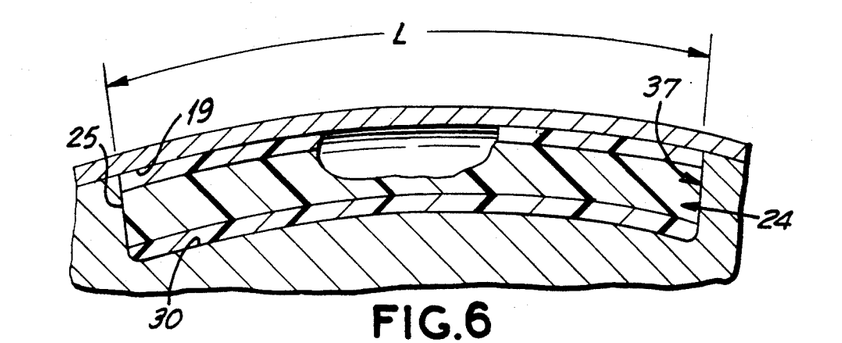
FIG. 6 shows a cross-section of the melt stream as it is being deformed downstream from FIG. 5, and is taken at 6—6 of FIG. 4.
Figure 7:
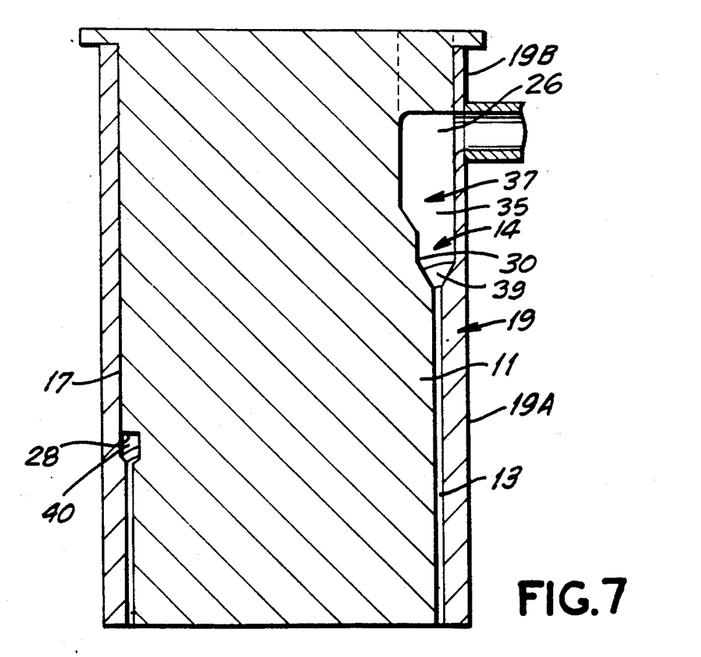
FIG. 7 shows a cross-section of the die, taken at 7—7 of FIG. 4.

FIG. 4 generally shows, in more detail than FIG. 2, an elevation view of the mandrel 11. Containing wall 19 of the die is cut away in FIG. 4, and shown in cross-section, to expose detail of the surface contour of the passage 37 which extends between adapting zone 26, through throat 35, groove 14, and channel 13, to annular opening 31. FIGS. 5, 6, and 7 further illustrate those contours.

Figure 12:
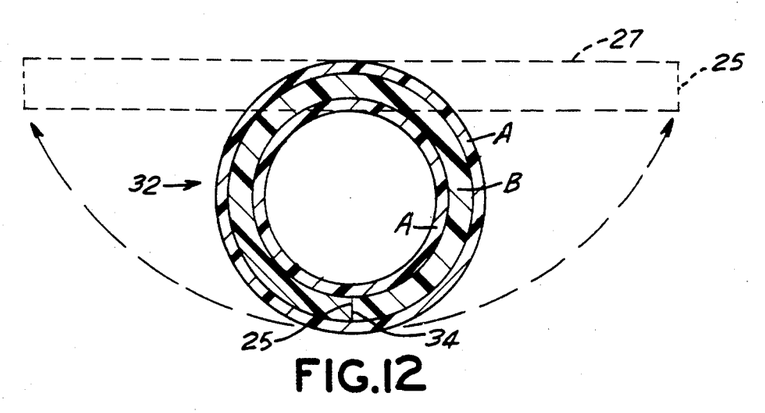
FIG. 12 shows a cross section of a tubularly shaped film of the invention, taken at 12—12 of FIG. 4, and made with method and apparatus of the invention, along with a phantom representation of a corresponding rectangle.

It is generally not acceptable to change the melt stream configuration significantly to a configuration which disrupts the generally planer configuration at surface 25, as this can disrupt the ability to join the edges of the individual layers at the weld line. Absent that ability to join individual layers of the A/B/A melt stream 25 at the weld line, as illustrated in FIG. 12, it is not possible to fabricate a weld line, as defined herein, which extends through the melt stream.

A minor configuration change, typical of this invention, is illustrated by comparison of FIGS. 3A and 5, and noting the annular adaptation in FIG. 5, of the rectangular configuration seen in FIG. 3A. As seen in FIG. 5, this minor adaptation of the overall configuration does not disrupt the ability to join the respective edges of the individual layers at the weld line. It is acceptable for width and thickness deformations such as those seen by comparison of FIGS. 5 and 6 to be affected in adapting zone 26, but it is generally preferred to delay the length/thickness deformations until after the directional change has been accomplished in adapting zone 26. Thus the length/thickness ratio of the cross-section of the melt stream 24 is preferred to be approximately the same at locations immediately before and after adapting zone 26, and as represented by FIG. 3A and 5.

Comparing, now, FIGS. 4, 5, 6, and 7, it is seen that the passage 37 becomes wider and thinner in traversing from adapting zone 26, through throat 35, to crosshead groove 14. Accordingly the length "L" of melt stream 24 is greater at the 6—6 location of FIG. 4 than at the upstream 5—5 location. Accordingly, the thickness of the melt stream at 6—6 is correspondingly less. Similarly, as the width of the passage 37, which corresponds to the length "L" of the melt stream, is increased in traversing between 5—5 and 6—6 of FIG. 4, the thickness of passage 37, (which is perpendicular to the width of the passage) and accordingly the thickness of melt stream 24, along with the thickness of each of the layers, is reduced, as represented in FIGS. 5, 6, and 7.

The lengthening and thinning deformations of the melt stream, along passage 37, correspond respectively and generally to the lengthening and thinning typically encountered at the initial stages of deformation of a melt stream in a conventional cast coextrusion straight slot die for forming flat sheets of film, which die can receive a multiple layer melt stream from a multiple layer combining adapter feedblock. In such cast coextrusion processes, the melt stream traverses a generally singular direction while the melt stream is being deformed from a generally thicker section configuration as represented in FIG. 3A to its longer and thinner cross-section configuration just prior to exiting the straight slot die.

In this invention, this generally singular direction of flow has been adapted by essentially wrapping the deforming configuration, of the slot die passage, and thus the contained melt stream, around an annular mandrel, thus introducing a new annular, third dimension to the interior surfaces of the die passage in such a way that the laminate layer relationships and flow relationships characterized in conventional multiple layer cast coextrusion dies are applied in the third dimension as the die and melt stream are adapted to tubular coextrusion. It is critical that the integrity of (i) each of the layers, (ii) the layer relationships, (iii) and the layer interfaces, be preserved in the multiple layer melt stream. Accordingly, it is critical that the general cross-sectional shape of the film being extruded be defined, in principle, before the multiple layer melt stream 24 enters die 10 and that the general cross-section shape be maintained, in principle, as the melt stream passes through the die. These principles are illustrated as follows.

An annular film as formed in a crosshead mandrel approximates a wide and thin film, representing a long, narrow rectangle, which has been wrapped about an annular mandrel, and whose opposing edges have been joined at the weld line. Thus where a film of generally uniform thickness is to be fabricated in an annular die of the invention, the melt stream is maintained in a generally rectangular cross-sectional configuration between feedblock 20 and the exit opening of the die as represented by annular opening 31. As the rectangular melt stream becomes longer and thinner in traversing through the die passages, it is formed into a modified rectangle by wrapping it about the annular mandrel, through passage 37. As seen in FIGS. 5 and 6, minor deviations from the rectangular are acceptable along the length "L". However, any deformations preserve the general rectangular parameters of (i) length "L" (with two generally parallel sides), (ii) generally uniform thickness, and (iii) generally perpendicular angles, and include the maintenance of general layer relationships as the melt stream is lengthened and thinned, and as it takes on the curvature around the annular mandrel 11. FIGS. 5 and 6 illustrate the preferred rectangle wherein the lengths of the inner groove surface 30 and the opposing portion of the surface of containing wall 19 are the same. Accordingly, the outer surfaces 25 along the two ends of melt stream 24 are the same length, and are preferably parallel.

The combined disclosures of FIGS. 3A, 5, 6, 8, 12, and 14 illustrate that the die maintains the melt stream in a single basic rectangular shape as it traverses the die. FIGS. 3A shows the melt stream as a rectangle with radiused corners. FIG. 5 shows the same general rectangular shape, with the length of the rectangle conformed to the curvature of the mandrel, and with only two corners radiused. FIG. 6 shows further elongation of the rectangle, along the curvature of the mandrel, and a further reduction in thickness. As the melt stream passes through grooves 14 it goes through a transition whereby it encompasses the entire circumference of the mandrel.

"Rectangle" and "rectangular shape" as used herein refer to both the generic definition of a rectangle, including allowance for rounded corners as in FIG. 3A, and to curvilinearly modified rectangles as represented in, for example, FIGS. 5 and 6. The definition further represents rectangles which have been wrapped into a full annular as in FIGS. 12 and 14.

It is seen in, for example, FIGS. 4 and 7 that a rectangle having a constant thickness along its length is easily identified as at 5—5 and 6—6 of FIG. 4, in the vicinity of throat 35, and below the lower portion of groove 14 in channel 13. Between throat 35 and the lower portion of groove 14, the rectangular configuration generally is identified along contours defined at locations equidistant between the upper and lower surfaces 28 and 29 respectively of groove 14, for example the cutting plane of line 8—8 in FIG. 4.

The depth of groove 14, that is the distance between containing wall 19 and that inner surface 30 of groove 14 which is most disposed toward the interior of mandrel 11, can decrease in traversing between the head 39 of groove 14 (FIGS. 4 and 7), near throat 35, and the tail 40 of groove 14 (FIG. 7). The weld line 34 in the film is formed at the tail 40 of groove 14. Thus the term "rectangle", as it relates to the shape of the melt stream and die passages, also embraces a modified rectangle whose width (corresponding to the thickness of the melt stream) is thicker at its center (head 39 of groove 14) and thinner at its ends (tail 40 of groove 14).

Alternatively, the depth of groove 14 can be maintained constant about the circumference, and the height decreased. The height of the groove is the distance between upper surface 28 and the locus of entrance of the melt stream into channel 13. Also, a combination of variations of the height and depth of the groove 14 can be used.

Figure 8:
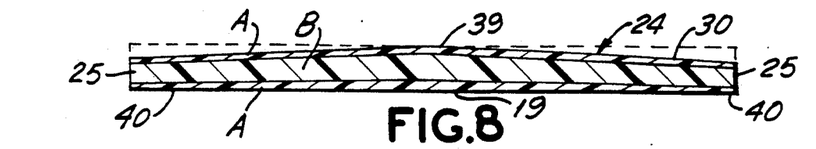
FIG. 8 is taken at 8—8 of FIG. 4, and shows a cross-section of the melt stream about the circumference of the groove, and laid out as a modified rectangle.

FIG. 8 shows a modified rectangle, which represents the melt stream 24 generally along 8—8 of FIG. 4, wherein the depth of the groove is varied. 8—8 in FIG. 4 represents a line extending about the full circumference of mandrel 11 and generally equidistant between upper and lower groove surfaces 28 and 29, namely equidistant between upper surface 28 and the locus of the beginning of channel 13. FIG. 8 shows the conceptual configuration of melt stream 24, wherein its true annular shape has been opened and straightened to show its relationship to a generic rectangle, the generic rectangle being shown in dashed outline. The typical relative positions of containing wall 19 and the inner surface 30 of groove 14 are indicated in FIG. 8, although those structural items are not shown. The overall thickness of the rectangle is exaggerated to enhance visualization of the principles being illustrated.

Figure 14:
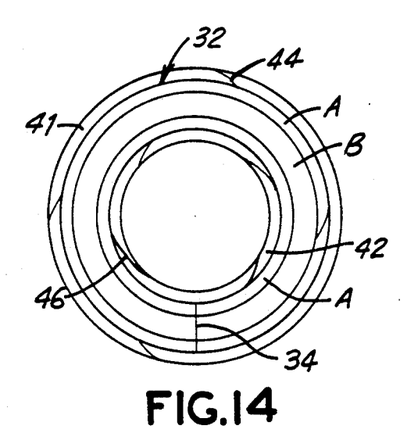
FIG. 14 shows a typical 3-layer film of the invention having fourth and fifth layers coextruded therewith to form a 5-layer film.

In addition to the above modifications, the rectangular shape of the melt stream is further modified in groove 14. A first modification is in its curvilinear conformation to the entire circumference of the mandrel 11, in completion of the process begun at 5—5 and 6—6, and as illustrated in FIGS. 5 and 6. A second modification in the groove, and as shown in FIG. 8, is that the rectangle is made thinner at its ends (tail 40 of groove 14) than in its middle (head 39 of groove 14). As seen in FIG. 8, though, the resemblance to the original rectangle of FIG. 3A is still clearly recognizable, in that only the top wall of the rectangle, corresponding to inner surface 30 of the groove, deviates from a classical rectangle, by being thinner at the ends than at the middle. If, however, the height between upper and lower groove surfaces 28 and 29 were varied, instead of the depth between walls 19 and 30, the thickness of the rectangle in FIG. 8 would not necessarily vary. The degree of the thickness variation in groove 14 is generally confined to groove 14, such that the overall thickness of the melt stream is uniform about its circumference as it traverses channel 13 and passes out of the die at opening 31, to produce an annular film as in FIG. 12. FIGS. 12 and 14 show a rectangular shape wherein the weld line 34 represents the ends 25 of the melt stream, and thus the ends of the rectangle. The outer and inner film surfaces correspond to the elongated sides of the rectangle, which in turn correspond to upper and lower surfaces 27 of the melt stream 24. FIGS. 12 and 14 thus represent a rectangular shape, as does the melt stream of FIG. 3A, the rectangles of FIGS. 12 and 14 having been modified by being formed into a circle. FIG. 12 illustrates in dashed outline the straightened-out rectangle represented by the annular film of FIG. 12.

At each stage of the traversal of the melt stream through the die, it retains its elements of four generally parallel sides, and four generally perpendicular angles. The parallelism varies slightly as indicated at FIG. 8. And the longer walls are curved as in FIGS. 5, 6, 12, and 14. However, at all stages in traversal through the die, the basic concept of a rectangle is recognizable, in the historical light of the modifications. So the single basic polygonal rectangular shape of the polymer melt stream is, and the layer relationships, are initiated in the feedblock, and are maintained throughout the traversal through the die.

As seen in FIG. 5, layer "B" is covered on its longer surfaces by two "A" layers such that contact between layer "B" and the die surfaces is limited to corresponding portions of the outer opposing surfaces 25 of the melt stream. As melt stream 24 passes from adapting zone 26 to the main body of groove 14 at throat 35, outer surfaces 25 flow along, and in contact with, upper surface 28 of groove 14. Thus contact between layer "B" and the die in the illustrated embodiments is indicated only at the opposing surfaces 25 of melt stream 24 as the surfaces 25 contact (i) opposing edges of adapting zone 26 and (ii) upper surface 28 of groove 14. Further, as melt stream 24 traverses about the circumference of groove 14, the cross-section of melt stream 24 becomes longer and thinner. Surfaces 27 of layers A become larger. The length across ends 25 becomes shorter. Accordingly, the fraction of the melt stream surface area (the sum of surfaces 27 and edges 25), which fraction is represented by the portion of the "B" layer which is in contact with upper surface 28 at edge 25, is reduced.

Figure 10:
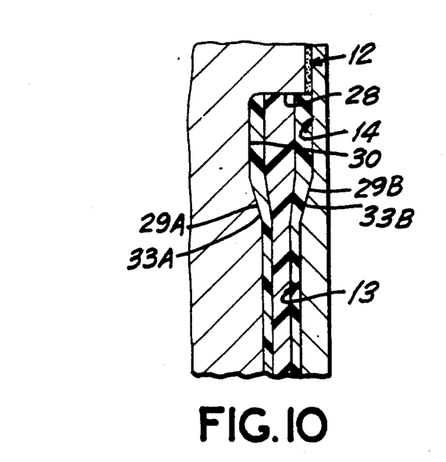
FIG. 10 shows a preferred cross-section of the 3-layer melt stream in the crosshead groove, as taken at 10—10 of FIG. 4.
Figure 11:
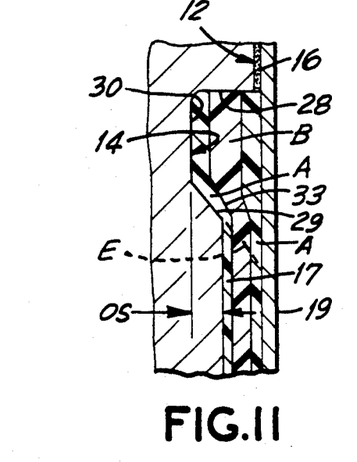
FIG. 11 shows a cross section of a 3-layer melt stream in an alternate crosshead groove.

The material of one layer A, on that side of melt stream 24 which is disposed against outer wall 19, is the primary material which is susceptible, in this process, of leaking into the fitment area 12 and especially into the stippled area 16, as seen in FIGS. 2, 10, and 11. Toward the objective of preventing material of layer B from entering the fitment area 12, as at stippled area 16, it is important that layer B be generally positioned, as with respect to groove upper wall surface 28, such that the configurational relationships among the layers are maintained as seen in FIGS. 10 and 11. Namely, the thickness of each layer as a fraction of the thickness of the cross-section of the melt stream, is preferably maintained generally constant about the circumference of mandrel 11.

Addressing, now, that objective, groove upper surface 28 preferably forms a more-or-less perpendicular angle with the layer interfaces, with containing wall 19, and with the direction of flow of melt stream 24. To the extent upper surface 28 deviates from a perpendicular with the layer inter- faces, the predictability of maintaining the desired layer configuration, and the uniformity of the layer fractional thicknesses about the circumference of the mandrel, can be jeopardized. Thus the distinct identity of especially upper surface 28 with respect to its perpendicularity is important in the preferred embodiments. Distinct identity for inner surface 30 is preferred, preferably perpendicular to upper surface 28. It is seen in FIGS. 10 and 11 that upper surface 28 defines a cross-section, at least in combination with the interior surface on containing wall 19, comprising at least two adjacent sides of a rectangle, the two adjacent sides being upper surface 28 and the adjacent portion of the inner surface of containing wall 19. Where wall 30 is perpendicular to upper surface 28, as in FIGS. 10 and 11, the groove defines a cross-section comprising three sides of a rectangle. The definition herein of groove 14, as in FIG. 11, includes not only the surfaces 28, 30, and 33 on mandrel 11, but also the space enclosed between those surfaces and the adjacent portions of the inner surface of containing wall 19. In the embodiment of FIG. 10, groove 14 includes both ramps 33A and 33B.

As melt stream 24 traverses downwardly out of groove 14 it encounters ramp 33, or ramps 33A and 33B, and is thinned as it traverses the ramp, or ramps, leading into channel 13. An imaginary extension "E" of ramp 33 (FIG. 11) forms an angle of about 20° to about 70°; preferably about 35° to about 55° with outer wall 19, and with that portion of outer surface 17 of mandrel 11 which is in channel 13, and extends toward the die outlet 31. Ramp 33 serves as a constant direction adapter between inner groove surface 30 and channel 13. Ramp 33 can have a varying angle, such as being arcuate, so long as the functional effect is equivalent to that of a constant direction ramp, in terms of directing uniform flow of the respective layer A from groove 14 into channel 13.

FIG. 11 shows the generic definition of the groove configuration required for producing multiple layer film. Ramp 33 is important to maintaining the relative layer relationships, about the circumference of the extruded tube. Ramp 33 is defined by that portion of the lower groove surface 29 which is neither parallel to outer wall 19, nor perpendicular to outer wall 19. Rather, it bridges an offset "OS" (FIG. 11) between inner groove surface 30 and outer surface 17 of mandrel 11. As seen in FIG. 11, ramp 33 is continuous between wall 30 of groove 14 and outer wall 17 of mandrel 11 in channel 13. As seen in FIG. 11, the lower groove surface 29 consists entirely of ramp 33.

It is acceptable herein that the lower surface 29 of groove 14, adjacent wall 30, include a higher angled portion thereof which forms an angle of greater than 70° (See "E" FIG. 11) with outer containing wall 19, so long as the higher angled portion is between wall 30 and channel 13, and constitutes less of the illustrated dimension of offset "OS" than the thickness, at inner surface 30, of the layer A which is disposed against inner surface 30. Preferably the higher angle portion is between wall 30 and ramp 33. Accordingly the amount of the offset "OS" that is traversed by the higher angled base wall portion defines, for a given die configuration, the minimum effective thickness, in groove 14, of the layer A which is against inner surface 30. This minimum thickness for layer A can be computed as a fraction of the groove depth (surface 30 to containing wall 19). Namely the minimum thickness fraction is the offset amount of the high angle base wall portion divided by the groove depth.

Figure 9:
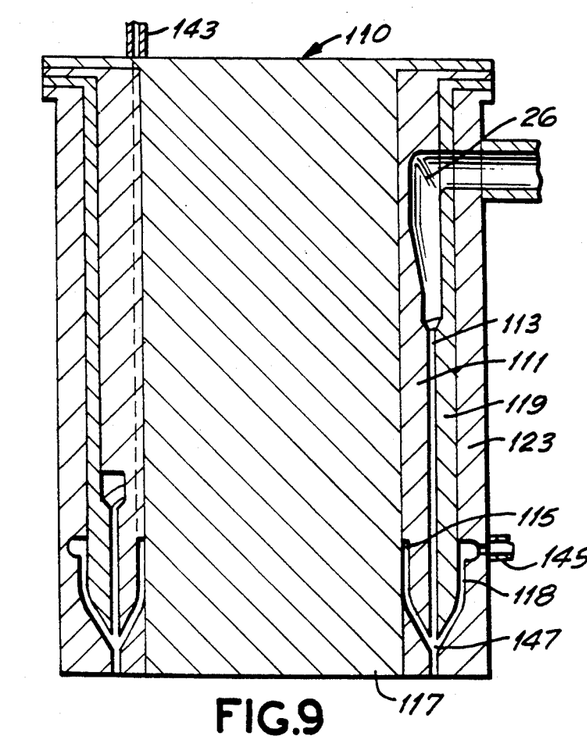
FIG. 9 shows a cross-section as in FIG. 7 wherein the die is adapted to incorporate inner and outer

FIG. 10 illustrates a preferred embodiment of the groove, as represented further by FIGS. 4, 7, and 9. In the FIG. 10 embodiment, a pair of ramps 33A and 33B are disposed on opposing sides of passage 37, joining groove 14 and channel 13. Ramps 33A and 33B provide symmetric adaptation of the cross-section of melt stream 24 to channel 13 as the melt stream traverses from groove 14 into channel 13. The symmetric adaptation illustrated in FIG. 10 is preferred, in that it results in improved uniformity, and more opportunity for control, of thickness of individual layers about the circumference of the coextruded film. As best illustrated in FIGS. 4 and 7, ramp 33A is provided as part of the outer surface 17 of mandrel 11 while ramp 33B is part of inner surface of containing wall 19. As seen in FIGS. 4 and 7, containing wall 19 has a lower portion 19A below ramp 33B which is thicker than upper portion 19B above ramp 33B. Ramps 33A and 33B generally form smaller angles with respect to surface 30, ranging from about 10° to about 50°, preferably about 20° to about 35°. Higher angle portions of each of the portions 29A and 29B of the lower groove wall are acceptable, as in the FIG. 10, with the same limiting relationship, as in the FIG. 11 embodiment, between the higher angle portion, and the thickness of the corresponding layer A.

When leakage occurs in the fitment area, polymer degradation results if the polymer leaking into the fitment area is a VDC copolymer. However, if the covering principles of this invention, regarding VDC copolymer, are being used, the polymer leaking into the fitment area 12 is that of a layer "A" whose composition has been chosen such that it is functionally free from VDC copolymer, whereby degradation of VDC copolymer from leakage into fitment area 12 is not a problem. In such case, the polymer leakage into fitment area 12 is of minimal consequence in that the materials contemplated for use in layers "A" are those which do not degrade significantly during the extrusion process. Thus the practice of the invention makes the process of extruding VDC copolymer more tolerant of polymer leakage into the fitment area. Specifically, the composition of layer "A" is carefully selected such that it does not functionally incorporate the temperature sensitive VDC copolymer problem.

As a result, tolerances in the die specifications can be somewhat relaxed, with attendant reduction in die cost. And since moderate polymer leakage into the fitment area, which can be associated with die wear, is not especially detrimental to the extrusion process in this invention, die life can be extended beyond the previously normal limit of tolerance to die wear. Namely, amounts of die wear which previously would have rendered the die unserviceable are now acceptable, in combination with the practice of the instant invention.

So the combination of the hardware disclosed herein, and the process improvements disclosed herein, provides a resulting process combination which is more tolerant of polymer leakage into the fitment area than conventional tubular extrusion process. In addition, the process greatly reduces the surface area of contact between VDC copolymer and the die surfaces.

Since a valuable feature of the invention is the shielding of VDC copolymer in the "B" layer from contact with the hot metal equipment surfaces, it is instructive to consider the degree of success achieved, namely the fraction of the surface of the "B" layer which is shielded, or in the alternative, the fraction of the internal equipment surfaces which are protected from contact with layer B. Accordingly, the fraction of the surface which is shielded at representative locations as the melt stream 24 passes through the equipment will be considered.

As the VDC copolymer is processed into the melt state in the extruder (not shown), the VDC copolymer is subjected to the heat of the extruder and is in full contact with all surfaces of the extruder. At that locus in the process, 100% of the surfaces of the VDC copolymer melt stream are exposed to the surfaces of the extruder. Also 100% of the internal surfaces of the extruder are exposed to the VDC copolymer. This mutual 100% exposure, of the extruder surfaces, and of the VDC copolymer, is conventional.

As the VDC copolymer melt stream is processed through feedblock 20, it is deformed into a rectangular shape and receives shielding layers A on its upper and lower surfaces, as illustrated at 15 in FIGS. 3 and 3A. By scaling the surfaces of layer B in FIG. 3A, it is seen that, even at this early stage of the process, where the VDC copolymer is shielded the least, approximately 80% of the surface of layer B is shielded by the two layers A, in this invention. Only the ends of layer B, at edges 25, representing about 20% of the surfaces of layer B, remain unshielded. Similarly, about 80% of the inner surfaces of feedblock 20 are shielded subsequent to the interposition of the layers A at joinder 15.

The cross-section of melt stream 24 through adapting zone 26 enjoys a similar level of protection of about 80% of the surfaces of layer B, as defined at the outer edges 25 and at upper and lower surfaces 23. Similarly, about 80% of the equipment surfaces are protected. As discussed above, as the melt stream advances past adapting zone 26, and past the location of 5—5 as seen in FIG. 4, the passage 37 begins transforming the melt stream shape, such that it becomes longer and thinner. FIG. 6 indicates, by scaling, shielding of the VDC copolymer layer surfaces, as at throat 35, of greater than 90%. Beyond throat 35, the complexity of the die geometry and the melt stream flow makes it difficult to visually illustrate the fraction of the surface area of layer B which is shielded in groove 14. However, the exposure of VDC to the apparatus surfaces is limited to the contact between upper groove surface 28 and the adjacent edge portion of layer "B", derived from edge portion 25 of melt stream 24. As seen in FIG. 12, the edges of the melt stream 24 which correspond to edges 25 generally function in fabrication of weld line 34, and so are indicated in FIG. 12. So the corresponding derivatives of end surfaces 25 are joined to each other at tail 40 of groove 14, and are in such relative disposition in channel 13, whereby surface contact between layer B and apparatus surfaces is essentially nil as the melt stream passes out of groove 14 into channel 13. The last contact between layer B and apparatus surfaces is believed to be at the upper surface 28 of the tail 40 (FIG. 7) of groove 14. The general nature of the contact between layer "B" and upper surface 28 is seen in FIGS. 10 and 11.

Thus in the illustrated embodiment, the minimum shielding of layer B, at any one location beyond the joinder of layers "A" and "B" at 15 in the feedblock is 80%, based on layer B surface area (e.g. surfaces 23 and the edge elements of layer B at edge portions 25). At cross-section 6—6 the shielding of the surface area of layer B is already over 90%, (by scaling of surfaces in FIG. 6) and approaches/reaches 100% downstream from groove 14, whereby over 90%, and typically over 95% of the surface area of the layer B melt stream in the die at any given time is shielded from contact with the die surfaces, while providing for a weld line through layer B, and joining ends of layer B at that weld line.

Another way to assess the degree of shielding is to assess/estimate the fraction of the internal apparatus surfaces which are in contact with layer B beyond the joinder of layers "A" and "B" at 15 in the feedblock. Using this basis, it is seen that FIGS. 3A and 5 indicate about 17%–21% of those individual die cross-section surfaces as being in contact with layer B. FIG. 6 indicates about 8% of the die surface being in contact with layer B. And while the overall fraction of the die internal surfaces which are in contact with layer B depends on many detailed features of the internal die geometry, and on melt stream structure, the apparatus and processes disclosed herein are well adapted to shielding at least 90% of the internal apparatus surfaces, beyond the joinder of layers "A" and "B" at 15 in the feedblock, from contact with layer B, preferably at least 95%, and potentially up to 97–98%, depending on the specific apparatus design and the relative thicknesses of the three layers.

With respect to extrusion of VDC copolymer, the reduction in the surface area of contact between the VDC copolymer and the die, by for example 90%, as illustrated in FIG. 6, reduces, accordingly, the amount of catalysis occurring at the interface between VDC-copolymer and the die surfaces. The rate of degradation of VDC copolymer is reduced. Likewise, the associated build-up of carbon in the die is attenuated. Accordingly, using this invention, VDC-copolymer extrusion processes can be operated in normal specification ranges, for extended periods of time between shut-downs for die cleaning. Typical time periods are contemplated to run at least a month, and perhaps longer.

The combination of the tubular die in combination with the non-VDC copolymer coextrusion feedblock, which feedblock was previously used to feed a coat hanger die for cast extrusion of flat sheet film, is herein seen to be advantageous for adaptation to a tubular coextrusion process including a VDC copolymer layer. The non-VDC copolymer layer A encloses most (i.e. greater than 75%, especially greater than 90%) of the surfaces of VDC copolymer layer B in the die 10, such that the surface area of contact between the VDC copolymer and the respective surfaces of the die is usually extremely limited. The surfaces of the VDC copolymer layer "B" include the outer edges at 25 (e.g. FIGS. 3A, 5, and 6) and the surfaces of layer "B" at the two interfaces between layer "B" and the two layers "A". The interfacial surfaces are seen in edge view as lines in FIGS. 3A, 5 and 6.

With the surface area of contact between layer "B" and the equipment surfaces so limited, the problem associated with extended contact between the VDC copolymer and major surface areas of the die is accordingly attenuated, as discussed above. The extrusion processing of VDC copolymer in annular dies is thus facilitated and made possible for longer periods of time because the carbon build-up associated with contact between elevated temperature (melted) VDC and the elevated temperature apparatus surfaces is reduced in line with the reduction in that contact.

The size of tubular dies for processing VDC has conventionally been limited in order to limit the length of the path traversed by the melted polymer as it flows through the die. Limiting the length of the die path has been used as a method to limit the length of time of exposure of VDC copolymer to the elevated temperature processing conditions. As seen above, using the apparatus and methods of the invention, the amount of VDC contact with equipment surfaces is reduced. The time of 100% contact is also reduced. Thus the time-temperature-contact relationship, of the VDC copolymer has, in large part, been intercepted, and circumvented. Accordingly, the degradation of VDC polymer normally experienced as a result of the time-temperature-contact relationship, and as evidenced by the production of carbon particles, has been attenuated. The use of the invention herein now makes it practical to use tubular dies of sizes which are more conventionally associated with extrusion processes which do not use VDC copolymer. Such dies typically run up to about 250 cm. (about 100 inches) in circumference, and in some cases greater, such as up to about 350 cm. (138 inches) or more. However, even die circumferences in the range of 50–60 cm. (20–40 inches), when used according to this invention, are an improvement over the sizes of dies typically used in the commercially practiced art.

Die circumferences in the range of 90 cm. (35 inches), and up to the maximum circumferences now practiced in the art, including all sizes in between, will be generally susceptible to conventional development with respect to their adaptation to VDC copolymer extrusion in light of the instant disclosure. While larger sizes are contemplated as being possible for use without degrading the VDC copolymer, other limitations on the die size enter into play when these larger size dies are considered. Such issues related with those larger sizes, and their adaptations, to the extent they are not related to the time-temperature-contact sensitivity of VDC copolymer, form no part of this invention.

The circumference of the film which can be extruded from annular dies in this invention is related to the circumference of the die, whereby the circumference of the film may be as small as less than the circumference of the die, or up to about 2.5, or more, times the circumference of the die. The circumference of the film is preferably controlled primarily by a trapped gaseous bubble in the polymer tube, or in some cases a slight vacuum, as the polymer is extruded from the die. Entrapped liquid, in the bubble, as is commonly used with some extrusion processes, is likewise contemplated as suitable for use in some embodiments of this invention.

Using this invention, larger circumference films containing VDC copolymer, can be fabricated. Thus films having a circumference greater than, for example, 200 cm. (79 inches) can be fabricated from a die having a circumference of 80 cm. (31 inches), at a blow-up ratio of, for example, 2.5/1. All blow-up ratios normally practiced with VDC are contemplated. Accordingly, a die having a 90 cm. (35 inches) circumference can be used to fabricate a film e.g. 225 cm. (89 inches) circumference at 2.5/1 blow-up ratio, and a die having a circumference of 100 cm. can be used to similarly fabricate a film having a circumference of 250 cm. (98 inches). Dies 125–150 cm. (49–59 inches) circumference can accordingly fabricate films up to about 310–375 cm. (122–148 inches) circumference. And a die having a 250 cm. (98 inch) circumference can be used to fabricate films up to about 625 cm. (246 inches) circumference.

The tubular films so produced are suitable for solid state molecular orientation as is conventionally practiced in the solid state and above the glass transition temperature (Tg) of the material being so oriented.

The illustrated film blow-up ratio of 2.5 times the die size is exemplary only, and is controlled by parameters not related especially to processing VDC copolymer. Blow-up ratios more or less than that illustrated are contemplated in this invention, and can be selected independent of the VDC copolymer sensitivity factor. Thus, as blow-up ratio technology advances, blow-up ratios used with this invention will be affected accordingly. The extruded tube need not be blown up, though, and can even be drawn smaller in circumference than the die, all as in conventional tubular processing technology, and same is not controlled by the presence of VDC copolymer.

Operating temperatures in the embodiments illustrated in FIGS. 4 and 7 correspond generally to conventional operating temperatures used in coextrusion of VDC copolymers to form conventional multiple layer films, of which one example is /EVA/VDC/EVA/. Normal operating temperature adjustments and variations apply.

FIG. 9 illustrates a multiple mandrel die 110 adapted to produce the tubular film illustrated in FIG. 14. The three layer A/B/A composite melt stream 24 flows in channel 113 between an interior mandrel 111 and containing wall 119, all corresponding generally to channel 13, mandrel 11, and containing wall 19 respectively in FIG. 7. Channel 115 is fed through either mandrel 111 or central mandrel 117, for example by spiral passages from feed pipe 143, and carries the melt stream which produces layer 42, including spiral weld lines 46. Channel 118 is fed through outer containing wall 123, and carries the melt stream which produces layer 41, including spiral weld lines 44.

FIGS. 12 and 14 represent, in exaggerated thicknesses with respect to their diameters, tubular films 32 representative of films made using this invention. Film 32 comprises a central layer B enclosed on both sides by inner and outer layers A. Layers A and B in FIGS. 12 and 14 correspond to the respective layers A and B in the cross-section of melt stream 24 in FIGS. 3A and 5. The cross-section of the film in FIGS. 12 and 14 is thinner than the cross-section of the melt stream 24 in the conduit 22 and the adapting zone 26 of the mandrel.

A significant feature of the films of this invention is the weld line 34 shown in FIGS. 12 and 14. It is normal for VDC copolymers to exhibit a weld line through the VDC copolymer layer, as seen in prior art FIG. 13, as a result of having been coextruded through a crosshead type mandrel. The weld line typically is formed at a location 180 degrees around the circumference of the mandrel from the location where the melt stream entered the mandrel. The weld line extends through the VDC copolymer layer at a minimum average angle of at least 45 degrees, typically about 90 degrees.

With respect to FIG. 2, and the films of the invention, the entrance to the mandrel is associated with the adapting zone 26, and so the weld line in the film is associated with the left side of the mandrel as seen in FIG. 2, and also FIGS. 7 and 9. The weld line 34 in films of the invention touches each layer, as it passes through the radius represented by that layer, and extends through each of the layers at a generally consistent minimum angle of at least about 45 degrees, and an average angle, between the two surfaces of a layer and between multiple layer combinations, of at least about 45 degrees, preferably at least about 60 degrees, and typically approaching 90 degrees, as shown in FIG. 12. The term "minimum angle" is defined as that smallest measurable angle between the weld line and the respective surface.

Figure 13:
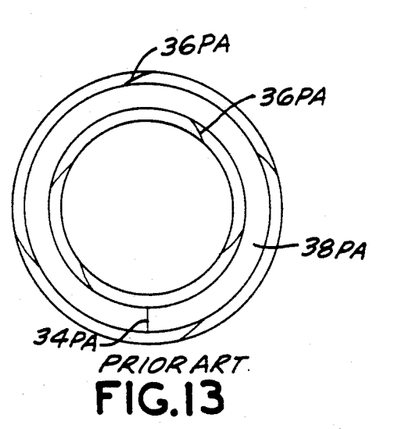
FIG. 13 represents a prior art film wherein only the VDC copolymer layer has a weld line with an average angle of greater than 45 degrees with respect to the surfaces of that same layer.

In a typical film of the prior art seen in FIG. 13, only the VDC copolymer layer has been processed through a crosshead type mandrel whereby only the VDC copolymer layer has a weld line with a large angle to the layer surfaces (e.g. perpendicular). The inner and outer layers in prior art structures have typically been processed through a different type of mandrel, such as a spiral mandrel, which does not create a weld line at a minimum angle of at least 45 degrees, especially a perpendicular angle to the surfaces of the layers. Rather, spiral type mandrels are intentionally designed to provide weld lines which approach the surfaces of the related layers at angles substantially less than 45 degrees to those surfaces. Typical spiral weld lines, formed through a spiral mandrel, are seen at 36PA in FIG. 13. As seen in FIG. 13, only the VDC copolymer layer 38PA exhibits the weld line 34PA having an angle greater than 45 degrees to the surfaces of the associated layer 38PA. Referring to spiral weld lines 36PA as seen in FIG. 13, those weld lines approach the surfaces of the related layers at angles of less than 45 degrees, and extend through the layers at average angles less than 45 degrees. FIGS. 13 and 14 are film cross-sections. They do not have the normal cross-section hatching, as that would obsure the spiral weld lines 36PA, 44 and 46.

Within the definition of this invention, it is acceptable for layers 41 and 42 to have weld lines approaching the respective layer surfaces at angles greater than 45 degrees so long as those weld lines are displaced angularly from the weld line 34, whereby the nominal line of weakness along weld line 34 is reinforced by layer 41.

It is known to interpose a continuous adhesive layer portion between overlapping edges of the VDC copolymer layer, and to position corresponding adhesive layers on both surfaces of the VDC copolymer. The interposed adhesive layer portion approaches the respective surfaces of the VDC copolymer layer at approximately 90° angles. However, the average angle is less than 45°, surface-to-surface, and the overlapping edge components of the VDC copolymer layer are separated by the adhesive portion.

By contrast, in the films of this invention, the average angle of the weld line, surface-to-surface, is at least 45° and the edge components of the VDC copolymer layer are in surface-to-surface contact, in defining the weld line in the VDC copolymer layer.

A weld line is defined herein by two edges of a given material in edge to edge contact. In films of this invention, the weld line comprises the contiguous composite of the surfaces of the individual weld lines defined in each of the respective layers A, B, and A. The weld line, accordingly, extends sequentially through the three layers of the A/B/A structure, touching two edges of each layer, at the contiguous composite of the interfacial surface. Thus each layer has two edges contacting each other at the weld line.

The capability of the VDC copolymer to tolerate coextrusion for an extended period is understood within the context of the thermal processing history of the VDC copolymer as it progresses through the equipment. Conventionally, VDC is exposed to the hot metal equipment surfaces. This exposure contributes to degradation of the VDC copolymer, throughout the process, from extruder to die outlet. In this invention, the VDC copolymer is protected at the feedblock, and all points beyond. And its temperature is maintained within an acceptable range (e.g. up to 190° C.). So the VDC copolymer experiences less of the stress associated with higher temperature metal contact than is experienced in conventional VDC extrusion processing.

The single act of covering the VDC copolymer layer with the A layers, and thus substantially reducing its contact with internal surfaces of the equipment, yields a plurality of related benefits.

Typically, after 7-10 days of operation, a conventional process is shut down for cleaning, or is purged for cleaning purposes. Using this invention, the process can be operated for a significantly longer time, while producing film of equal or better quality.

A compromise typically made, throughout the industry, in conventional practice of fabricating VDC films, is that the processing run is usually continued for a time after the film quality has begun to decrease, in order to obtain an average processing run time long enough to make the operation economically feasible, and whereby the film can effectively compete in the commercial market place. Namely, the film quality specification is defined such that it accommodates the processing limitations rather than being defined primarily according to the use for which the film is intended.

Since the methods of this invention can be used to produce high quality film for a substantially longer period than prior methods, the film specifications can be rewritten to reflect that higher quality film. And the higher quality specification can be met by the process disclosed herein, at an acceptable cost. Thus the overall film quality can be improved without an unacceptable increase in cost.

A typical film of the invention, and represented by FIG. 12, is of the order of 0.05 mm. (2 mils) to 0.10 mm. (4 mils) thick. Films as thin as 0.03 mm (1 mil) are contemplated, and films up to about 0.5 mm. (20 mils) are commonly extruded by the tubular process. Thicker films can also be fabricated, but are generally less preferred.

Table 1 illustrates exemplary 5-layer structures. Layers 41, A, B, A, and 42 correspond to the respective layers in the cross-section of FIG. 14. The tie layers and layers 41 and 42 are optional, and can be omitted where the desired properties are otherwise obtained. Within Table 1, it is generally possible to select combinations of compositions for the two surface layers at will from the given selections. Each listed polymer is in fact a family of polymers. Two or more members listed for surface layers 41 and 42 can generally be mixed together Further, each listed family is representative of the dominant polymer Other polymers may be included either in blend composition, or copolymerized with the dominant (e.g. at least 50% mole) polymer.

Selection of specific polymers for the intermediate layers "A" and/or the tie layers, depends on bonding properties with respect to the compositions selected for the respective and adjacent layers. Most EVA and EMA compositions bond satisfactorily to extruded VDC, especially vinylidene chloride methyl acrylate copolymer. With respect to vinylidene chloride methyl acrylate copolymers, it is noted that those having essentially no EVA blended therein exhibit superior gas barrier properties, especially post-retort gas barrier properties, and reference is made to commonly owned and concurrently filed U.S. application Ser. Nos. 07/458,483, 07/458,487, 07/458,485, now U.S. Pat. No. 5,089,308, 07/458,484, 07/458,486, 07/458,489, and 07/458,490 which are hereby incorporated herein by reference. The bonding properties of the several members of the EVA and EMA families with respect to the polymers listed for layers 41 and 42 are fairly well known, whereby the suitability of a given "A" layer composition for use with a selected composition for layer 41 or 42 can now be confirmed through routine confirmation testing.

The layer numbering in Table 1 corresponds to the layer numbering in FIG. 14.

TABLE 1

| Optional Layer 42 | Optional Tie | Layer A | Layer B | Layer A | Optional Tie | Optional Layer 42 |
|---|---|---|---|---|---|---|
| ULDPE | Extrudable Adhesive and blends thereof | EVA EMA and blends thereof | VDC preferably VDC-MA | EVA EMA and blends thereof | Extrudable Adhesive and blends thereof | ULDPE |
| LDPE | | | | | | LDPE |
| HDPE | | | | | | HDPE |
| LLDPE | | | | | | LLDPE |
| LMDPE | | | | | | LMDPE |
| LHDPE | | | | | | LHDPE |
| Ionomer | | | | | | Ionomer |
| EAA | | | | | | EAA |
| EEA | | | | | | EEA |
| EMA | | | | | | EMA |
| EMAA | | | | | | EMAA |
| EVA | | | | | | EVA |
| PP | | | | | | PP |
| PPE | | | | | | PPE |
| Polyamide | | | | | | Polyamide |
| Polyester | | | | | | Polyester |
| Copolyester | | | | | | Copolyester |
| Polycarbonate and blends thereof | | | | | | Polycarbonate and blends thereof |

Figure 15:
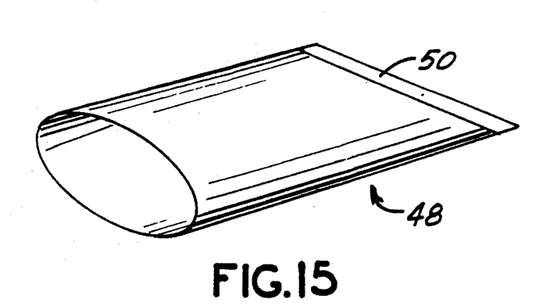
FIG. 15 shows a pictorial view of a typical pouch type package made with a film of the invention.

Attention is turned now to FIGS. 14 and 15, and the exemplary embodiment wherein layer 41 is a polypropylene either homopolymer (PP) or propylene ethylene copolymer, up to 10 weight percent ethylene (PPE), and layer 42 is LLDPE. In forming a package with the sheet material of the invention, seals are typically made by driving heat through the sheet material from one surface (e.g. at layer 41) to the other surface (e.g. layer 42). In the exemplary embodiment being herein discussed, the LLDPE composition will soften and form heat seals at a lower temperature than will the PPE composition. Therefore, in selecting the compositions for the surface layers, e.g. (i) the layer which forms the heat seal and (ii) the layer which contacts the seal-forming hot bar, the relative softening temperatures are appropriately considered; whereby sufficient heat can be driven through the outer layer 41 to activate the formation of heat seals at the inner layer 42, without undue softening of layer 41, or its sticking to the LLDPE for layer 42 is thus compatible with forming heat seals. Similarly, LLDPE can be used in layer 41, with a lower melting composition on such as ionomer being used for layer 42.

The films of the present invention may be formed into laminates with other polymer layers by conventional coextrusion techniques. In addition, the films may be oriented. The films of the invention are also susceptible to being fabricated into packages, using conventional package making processing usually practiced with such film, or similar films. Typical of such packages is pouch 48 which can be fabricated by forming a seal 50 at one end of a length of the tube structure which is fabricated by a film-forming method of the invention. Typically the inner surface of the extruded tube (e.g. layer 42 FIG. 14) forms the inner surface of the package, and the outer surface of the extruded tube forms the outer surface of the package.

As illustration of a more simple embodiment of the invention, a 2-layer tubular film can be fabricated with a single layer die by combining two polymeric compositions in a 2-layer feedblock and passing them through the corresponding mandrel 11, to form a 2-layer substructure. In this embodiment, the "B" layer of VDC is disposed against inner groove surface 30. The "A" layer is disposed against the inner surface of containing wall 19. While such a practice will not, in general, provide the "A" layer shielding function for mandrel 11, it does provide a shield between VDC layer "B" and containing wall 19. It further prevents leakage of VDC polymer into the fit area 12, including stippled area 16.

Broadly speaking, then, the invention provides the capability to fabricate a tubular film in a coextrusion die, with each layer extending the full circumference of the film tube. The ability to join the edges of the individual layers in abutting relationship at the weld line is a function of each of the layers extending to the edge surfaces 25 of the polymer melt stream 24 which is formed in feedblock 20.

A specific use contemplated for the methods and apparatus of the invention is the positioning of adhesive layers A on structure as in crosshead mandrel 11 and wherein inner and outer fourth and fifth layers are positioned on either side of the adhesive layers in a 3 layer die as seen in FIG. 9. In structures using VDC copolymer, and wherein the adhesive material is an ethylene vinyl acetate (EVA), a structure of the following nature can readily be fabricated.

/LLDPE/EVA/VDC/EVA/LLDPE/

In the above structure the VDC copolymer layer typically comprises 10%-40% of the thickness of a film which is 0.05-0.10 mm. (2-4 mil) thick. The EVA layers typically comprise 5%-10% of the thickness. The balance of the thickness can be distributed between the 2 LLDPE layers as desired.

The films fabricated in tubular form according to the invention can be subjected to subsequent extrusion processing steps and additional film converting processes which are common to the art. Exemplary of the extrusion processing steps are extrusion coating, extrusion laminating and coextrusion coating of tubular films as is well known. Exemplary of additional converting process steps are the steps of irradiating the films, heat setting the films, adhesive laminating the films, and the like.

The apparatus and methods of the invention are generally such that the several layers passing through feedblock 20, conduit 22, and mandrel 11 are in contact with each other in the apparatus, especially with respect to conduit 22, at the melt temperatures for a greater length of time than is normal in conventional coextrusion processes wherein the melt streams are joined later, such as near the die exit. This greater length of time of contact is seen as being instrumental in the advantageous development of additional bonding strength between the related layers at their corresponding interfaces.

While the invention has been disclosed with respect to the advantages of using the apparatus and processes of the invention with films containing a layer of about 100% VDC, layers containing a blend of, for example, as little as at least 25%, especially at least 50%, VDC will exhibit problems of degradation and carbon formation, similar to those discussed herein, absent accommodations therefor such as in the principles of the invention disclosed herein. Thus films containing at least 25% VDC in one or more layers, can benefit from the principles of the invention. Accordingly, compositions containing at least 25%, preferably at least 50%, VDC, in one or more layers, are included within the meaning of the terms "VDC" and "vinylidene chloride copolymer" as used herein and in the claims.

In addition to its applicability with respect to films, this invention can also be used in fabrication of tubes and bottles, as well as packages. In fabrication of tubes, the extrudate can generally be extruded in the form of a continuous tube having the desired cross-section of layers in essentially the desired thicknesses. Generally the thicknesses of such tubes are about 0.25 mm. (10 mils) to about 0.61 mm. (24 mils), preferably about 0.33 mm. (13 mils) to about 0.46 mm. (18 mils).

In fabrication of bottles, a tubular parison is first extruded having a thickness of about 0.76 mm. (30 mils) to about 5 mm. (197 mils), typically about 2.3 mm. (90 mils). The sidewall thickness of bottles then blown from such a parison is typically about 0.40 mm. (16 mils) to about 1.3 mm. (50 mils), commonly about 0.8 mm. (30 mils).

Those skilled in the art will now see that certain modifications can be made to the apparatus and methods, and the resulting films and packages, herein disclosed with respect to the illustrated embodiments, without departing from the spirit of the instant invention.

While the invention has been described above with respect to its preferred embodiments, it will be understood that the invention is capable of numerous rearrangements, modifications, and alterations, and all such arrangements, alterations are intended to be within the scope of the appended claims.

Having thus described the invention, what is claimed is:

1. A method of fabricating a tubular multiple layer polymeric film from a plurality of in-feed streams of melted polymer, said method comprising the steps of:
   (a) feeding said in-feed streams into a coextrusion feedblock, said feedblock receiving said in-feed streams and combining said in-feed streams into a multiple layer melt stream, said melt stream comprising at least 2 layers;
   (b) conveying said multiple layer melt stream from said feedblock to an annular crosshead groove in an annular extrusion die, said die comprising a fluid communication passage extending between an inlet and an exit in said die;

(c) forcing said melt stream through said crosshead groove, over a pair of transition ramps on opposing sides of said passage, and into an annular film-forming channel; and (d) forcing said melt stream through said film-forming channel and out of said die at said die exit, thereby forming said exit melt stream into said tubular multiple layer polymeric film.

2. A method as in claim 1, and including combining said in-feed streams into a multiple layer melt stream comprising at least three layers in said feedblock, said at least three layers, including a first interior layer disposed between second and third ones of said at least three layers, said one interior layer extending to opposing outer surfaces of said multiple layer melt stream.

3. A method as in claim 2 and including selecting, for said first interior layer, a composition comprising vinylidene chloride copolymer.

4. A method of fabricating a tubular polymeric film, said method comprising the steps of:

(a) feeding a polymeric melt stream to an inlet of an annular die having a crosshead groove and an annular outlet in fluid communication with said inlet; and (b) forcing said melt stream through said annular die, and thereby fabricating said tubular film, while maintaining said melt stream in said die, in a single generic cross-sectional shape comprising a series of precursors of the shape of said melt stream as extruded from said die, wherein, said die has an annular film-forming passage between said groove and said outlet, and said forcing includes passing said melt stream over a pair of opposing transition ramps as said melt stream passes from said groove to said film-forming passage.

5. A method of fabricating a tubular film comprising a layer of vinylidene chloride copolymer, said method comprising the steps of:

(a) forcing a melt stream through a tubular die and thereby obtaining a tubular film, and wherein said die has a film forming passage which includes a pair of opposing transition ramps over which said melt stream passes said melt stream comprising a first layer of vinylidene chloride copolymer, and second and third polymeric layers on opposing surfaces of said first layer, said film comprising a corresponding first layer of vinylidene chloride copolymer, and corresponding second and third polymeric layers on opposing surfaces of said first layer, said film comprising a weld line therein, said weld line having been fabricated by joining opposing edges of corresponding layers of said melt stream in abutting relationship with each other in said die, whereby said corresponding layers comprise corresponding pairs of said abutting edges, said weld line passes through the radius represented by each layer and said weld line passes through each of the layers at a generally consistent minimum angle of at least 45°; and (b) while forcing said melt stream through said tubular die, shielding at least about 90% of the surface area of said vinylidene chloride copolymer layer of said melt stream, as in said die at any given instant, from direct contact with surfaces of said die.

6. A method as in claim 5 and including shielding at least 95% of the surface area of said vinylidene chloride copolymer layer of said melt stream from direct contact with surfaces of said die.

7. A method of fabricating a tubular film comprising a layer of vinylidene chloride copolymer, said method comprising the steps of:

(a) forcing a melt stream though a tubular die and thereby obtaining a tubular film, said die having a film forming passage which includes a pair of opposing transition ramps over which said melt stream passes said melt stream comprising a first layer of vinylidene chloride copolymer, and second and third polymeric layers on opposing surfaces of said first layer, said film comprising a corresponding first layer of vinylidene chloride copolymer, and corresponding second and third polymeric layers on opposing surfaces of said first layer, said film comprising a weld line therein, said weld line having been fabricated by joining opposing edges of corresponding layers of said melt stream in abutting relationship which each other in said die, whereby said corresponding a layers comprise corresponding pairs of said abutting edges, said weld line passes through the radius represented by each layer and said weld line passes through each of the layers at a generally consistent minimum angle of at least 45°; and (b) while forcing said melt stream through said tubular die, shielding at least about 90% of the internal surface area of said die from direct contact with said first layer.

8. A method as in claim 7 and including shielding at least 95% of the internal surface area of said die from direct contact with said vinylidene chloride copolymer layer of said melt stream.

9. A method of fabricating a tubular film comprising a layer of vinylidene chloride copolymer, said method comprising the steps of:

(a) forming a multiple layer polymeric melt stream comprising a first layer comprising a vinylidene chloride copolymer between second and third polymeric layers; and (b) forcing said melt stream through a tubular die having an inlet and an outlet, said outlet having a circumference of at least about 85 centimeters.

10. A method as in claim 9, and including forcing said melt stream through a tubular die having a circumference of at least 90 centimeters.

11. A method as in claim 9, and including forcing said melt stream through a tubular die having a circumference of at least 100 centimeters.

12. A method as in claim 9, and including forcing said melt stream through a tubular die having a circumference of at least 125 centimeters.

13. A method as in claim 9, and including forcing said melt stream through a tubular die having a circumference of at least 250 centimeters.

* * * * *